(12) United States Patent
Freitas et al.

(10) Patent No.: US 8,060,718 B2
(45) Date of Patent: Nov. 15, 2011

(54) UPDATING A MEMORY TO MAINTAIN EVEN WEAR

(75) Inventors: Richard Francis Freitas, San Martin, CA (US); Michael Anthony Ko, San Jose, CA (US); Norman Ken Ouchi, San Jose, CA (US)

(73) Assignee: International Business Machines, Armonk, NY (US)

( * ) Notice: Subject to any disclaimer, the term of this patent is extended or adjusted under 35 U.S.C. 154(b) by 655 days.

(21) Appl. No.: 11/425,365

(22) Filed: Jun. 20, 2006

(65) Prior Publication Data

US 2007/0294490 A1    Dec. 20, 2007

(51) Int. Cl.
    *G06F 12/00*    (2006.01)
(52) U.S. Cl. .. 711/165; 711/105; 711/159; 711/E12.071
(58) Field of Classification Search .......................... None
    See application file for complete search history.

(56) References Cited

U.S. PATENT DOCUMENTS

| | | | |
|---|---|---|---|
| 6,000,006 A | 12/1999 | Bruce et al. | |
| 6,618,291 B2 | 9/2003 | Piersimoni et al. | |
| 6,725,321 B1 | 4/2004 | Sinclair et al. | |
| 6,831,865 B2 | 12/2004 | Chang et al. | |
| 6,898,662 B2 | 5/2005 | Gorobets | |
| 6,985,992 B1 * | 1/2006 | Chang et al. | 711/103 |
| 2002/0120664 A1 * | 8/2002 | Horn et al. | 709/107 |
| 2004/0205289 A1 * | 10/2004 | Srinivasan | 711/103 |
| 2005/0204187 A1 * | 9/2005 | Lee et al. | 714/8 |

OTHER PUBLICATIONS

Dai, H. et al., "ELF: An Efficient Log-Structured Flash File System For Micro Sensor Nodes," SenSys'04, Nov. 3-5, 2004, pp. 176-187.
Chang, L-P. et al., "Real-Time Garbage Collection for Flash-Memory Storage Systems of Real-Time Embedded Systems," ACM Transactionson Embedded Computing Systems, vol. 3, No. 4, Nov. 2004, pp. 837-863.
Juurlink, B. et al., "Dynamic Techniques to Reduce Memory Traffic in Embedded Systems," CF'04, Apr. 14-16, 2004, Ischia, Italy, pp. 192-201.

* cited by examiner

*Primary Examiner* — Reginald Bragdon
*Assistant Examiner* — Thanh Vo
(74) *Attorney, Agent, or Firm* — Shimokaji & Associates

(57) ABSTRACT

A memory leveling system updates physical memory blocks, or blocks, to maintain generally even wear. The system maintains an update count for each block, incrementing a wear level count when the update count reaches a wear level threshold. The system compares a wear level of blocks to determine whether to update a block in place or move data on the block to a less-worn physical block. The system groups the blocks into wear level groups identified by a common wear level to identify blocks that are being worn at a faster or slower than average rate. If an empty block count of a least worn group drops below a threshold, the system moves data from one of the blocks in the least worn group to an empty block in a most worn group.

20 Claims, 12 Drawing Sheets

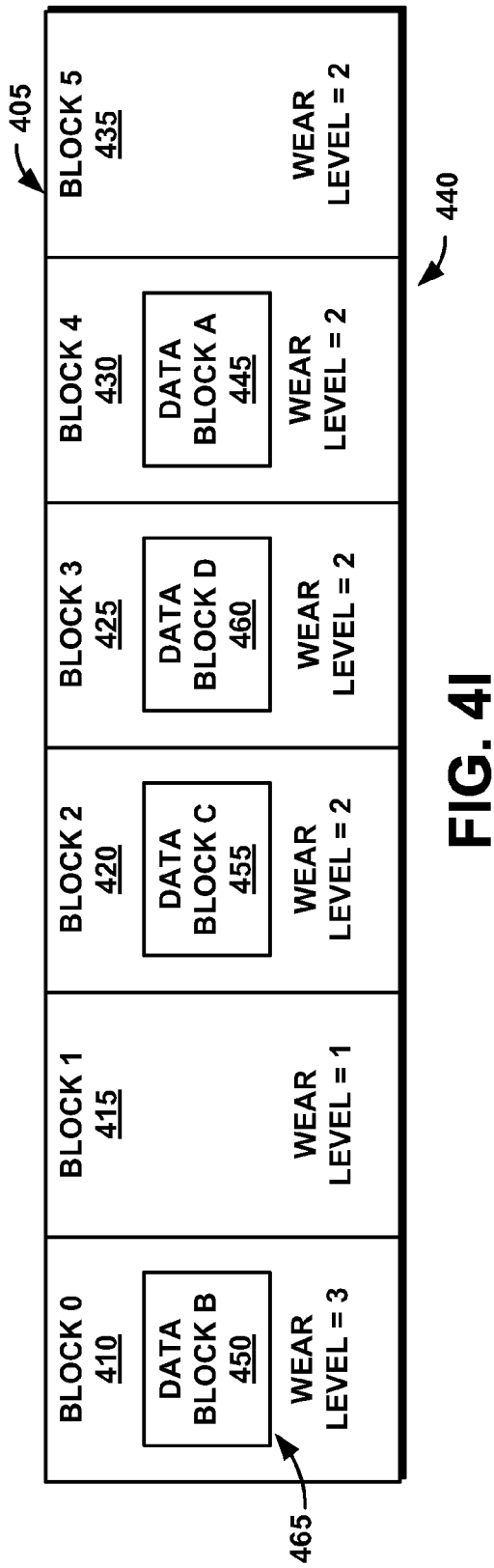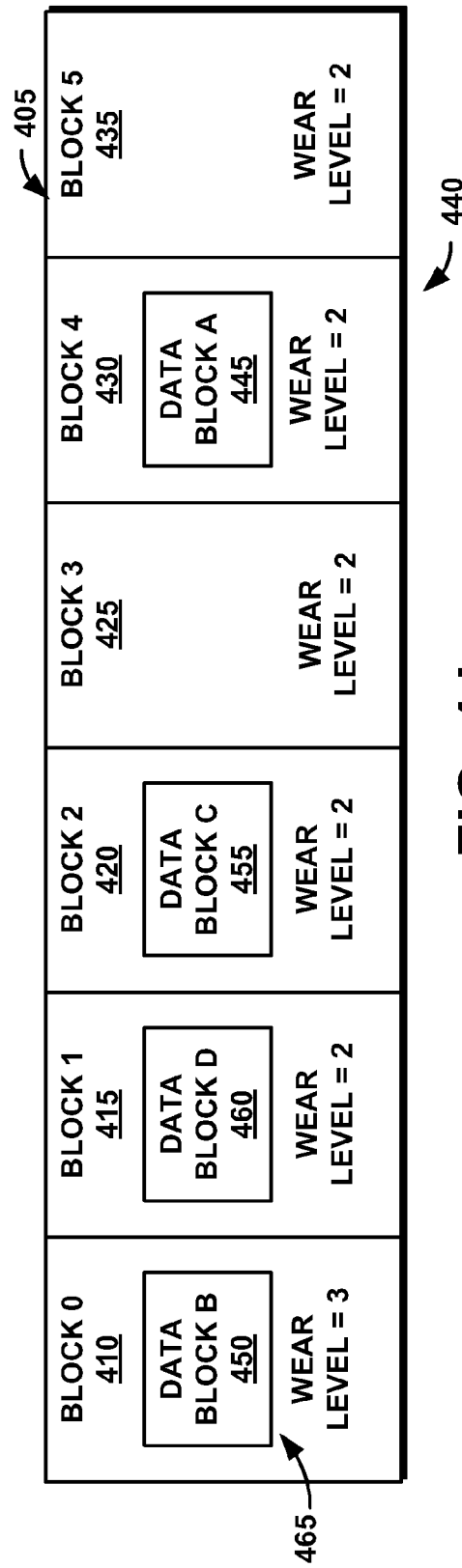
FIG. 4I
FIG. 4J

UPDATING A MEMORY TO MAINTAIN EVEN WEAR

GOVERNMENT INTEREST LANGUAGE

"This invention was made with Government support under Agreement No. NBCH30390004 awarded by DARPA. The Government has certain rights in the invention."

FIELD OF THE INVENTION

The present invention generally relates to addressable memories and in particular to storage class memories with a finite allowable number of writes to the memory before the memory wears out. The present invention further relates to a method of updating a memory to level wear on the memory, maximizing the life of the memory.

BACKGROUND OF THE INVENTION

Storage Class Memories, SCM, are nonvolatile storage technologies using low cost materials such as chalcogenides, perovskites, phase change materials, or magnetic bubble technologies. Storage class memories exhibit DRAM-like performance at lower cost than DRAM. The extrapolated cost over time can be equivalent to or less than that of enterprise class disk drives. The cost performance of the storage class memories provides a level in the storage hierarchy between the DRAM main system memory and disk storage. This level of storage may be viewed as a very large disk cache in which data can be stored permanently due to the nonvolatile characteristics of storage class memories.

Many storage class memory technologies are physical block addressed; i.e., unlike DRAM, a block of data is read or written. The physical block sizes typically range from 512 bytes to 4K bytes. Hence, storage class memory is suitable as a replacement for block access disk drives.

However, unlike DRAM and disk drives, storage class memory technologies provide a finite number of write cycles. Flash memories also exhibit this characteristic. While flash memories provide $10^6$ to $10^8$ write cycles, storage class memory technologies support $10^{10}$ to $10^{12}$ write cycles. To optimize the life of a storage device, data are written so that the storage medium is used in a uniform manner even if the write accesses are skewed to use a small set of addresses. The physical device space is divided into physical blocks that are written and read. The number of write cycles is tracked for each physical block so that when a physical block is updated, the data in the physical block (further referenced as a block of data or data) may be written to another physical block with lower wear. Distributing the written block of data to level the write operations prevents the loss of the device due to wear in a subset of physical block address that has frequent updates.

Flash memories use algorithms and file management structures to level the wear in the device. These differ from the storage class memory technologies in that flash memories require data be written into a physical block that has been erased. The erase process takes significant time compared to the read and write cycle time. Flash memories are organized with erase zones containing multiple physical blocks to enable the erasing of a number of physical blocks in parallel so that physical blocks are available for updating physical blocks of data. Thus, in a flash memory, the data moves with each update. Journal file structures have been used for wear leveling; tracking the wear level for each physical block is not required since all physical blocks are uniformly written. While providing even wear, many journal file mechanisms move a significant portion of the data and are actually a major cause of wear. Further, a time delay of milliseconds may be required to erase the physical blocks prior to updating. While useful for current applications, this time delay is unacceptable for most system memory applications.

In contrast to memory management of flash memories, storage class memory technologies provide an update in place capability so data need not be moved for update. A conventional wear leveling mechanism used by storage class memory technologies prolongs the life of the storage class memory device and requires additional data structures and overhead in accessing the physical blocks compared to direct physical block addressing.

A conventional wear leveling mechanism comprises an address translation system and a method for tracking physical block wear and for identifying physical blocks with low usage. Although this technology has proven to be useful, it would be desirable to present additional improvements.

The address translation system uses an address to access a block of data stored in a physical block of memory; the address translation system expects that the address used to access the data is constant independent of the physical block in which the data is stored. The storage class memory device provides a mapping of the system address for a block of data to the physical location of the physical block. When a block of data is accessed, the address translation identifies the physical block. For rapid address translation, an index structure or hash tables may be constructed. When a block of data is written to another physical block location, the map is changed to reflect the address of the newly written physical block. For a hashed or indexed translation table, the hash tables or indices are also changed. However, changing location of the data to another physical block requires address translation updating overhead.

A file system may provide the address translation; in this case the file system directories are updated when a block of data is written in a physical block of lower wear rather than the original physical block for the data.

Conventional storage class memory systems comprise a method for tracking wear of a physical block such that the number of write cycles for each physical block is tracked. For each write operation that requires the data to be moved for even wear, a physical block with a low wear level is identified and used.

One conventional mechanism for identification of empty physical blocks with low wear is an ordered list of physical blocks. The physical block at the end of the list has the lowest wear level. When the physical block with lowest wear is used, the wear level is incremented and the physical block is removed from the list. When the physical block is updated, the data in the physical block is moved to the physical block with least wear and the previously used physical block is inserted into the empty physical block list to maintain the ordered list. This conventional approach is useful for small devices. However, large devices pose a significant problem in maintaining the ordered list. For a device of 10 million physical blocks, the list requires a double linked list in which each link can address 10 million elements. An index structure can be defined for ease of insertion; the index can point to the boundaries between physical blocks with the same count. However, the number of wear level values can be very large since these technologies provide $10^{10}$ to $10^{12}$ write cycles.

Conventional storage class memory systems further comprise a method for identifying physical blocks with low usage. Some of the physical blocks are written infrequently or contain read-only data. These physical blocks have very low wear levels compared to physical blocks that have an average number of updates. If the percentage of physical blocks with infrequent write activity is low, having physical blocks with low usage does not affect the maximum lifetime of the storage class memory. However, if the percentage of physical blocks with infrequent write activity is significant, the remaining physical blocks experience significant wear compared to the physical blocks with infrequent write activity. For example, if 33% of the physical blocks in a storage class memory device are physical blocks with infrequent write activity, then the other 66% of the storage class memory device experiences 150% of the wear. Consequently, the life of the storage class memory device is 66% of a similar storage class memory device with even wear on most of the physical blocks.

What is therefore needed is a system, a computer program product, and an associated method for updating a memory to maintain even wear. A system is further needed to minimize overhead by minimizing a frequency of physical block moves and address table updates required to level wear on the memory. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") of updating a memory that includes physical memory blocks to maintain generally even wear across the physical blocks.

The present system maintains an update count for each physical memory block. When the update count reaches a predetermined wear level threshold, the present system increments a wear level for the physical memory block. The present system further compares a current wear level of the physical memory block to current wear levels of other physical memory blocks to determine whether to update the physical memory block in place or move data on the physical memory block to a less-worn physical memory block to provide even wear on the physical memory blocks. Updating the memory comprises editing, deleting, or otherwise changing portions of the data on the selected physical memory block. The update count represents a count of data writing events addressed each of to the physical memory blocks. Updating in place comprises updating to the physical memory block in which the data to be updated resides.

The present system groups the physical memory blocks into a plurality of wear level groups; each of the wear level groups identified by a common wear level to identify physical memory blocks that are being worn at a faster than average rate or slower than average rate. The wear level groups comprise a least worn group with a lowest wear level, a least worn group plus one with a wear level equivalent to the least worn group plus one, and a least worn group plus two with a wear level equivalent to the least worn group plus two.

Moving the data comprises moving the data to a selected physical memory block that is empty in the least worn group and incrementing the wear level of the selected physical memory block.

The present system maintains an empty block count of empty physical blocks in the least worn group; and if the empty block count drops below a predetermined empty block count threshold, moving data from at least one of the physical memory blocks in the least worn group to a selected physical memory block that is empty in the least worn group plus two and incrementing the wear level of selected physical block.

The present system utilizes an address table that provides translation from an address memory location to a location of any of the physical memory blocks; the address table comprises a listing of at least some of the physical memory blocks. The address table comprises a double linked list to identify one or more of a plurality of empty physical memory blocks and one or more of a plurality of not-empty physical blocks. The address table further comprises a value of the wear level for at least some of the physical memory blocks represented in the address table.

In one embodiment, the present system identifies an empty physical memory block in which data can be written by scanning the address table to locate a selected physical memory block in the least worn group to receive data from a physical memory block in the least worn group plus two. The present system further identifying an empty physical memory block for receiving data by scanning the address table to locate a selected physical memory block in the least worn group plus two to receive data from a physical memory block in the least worn group.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
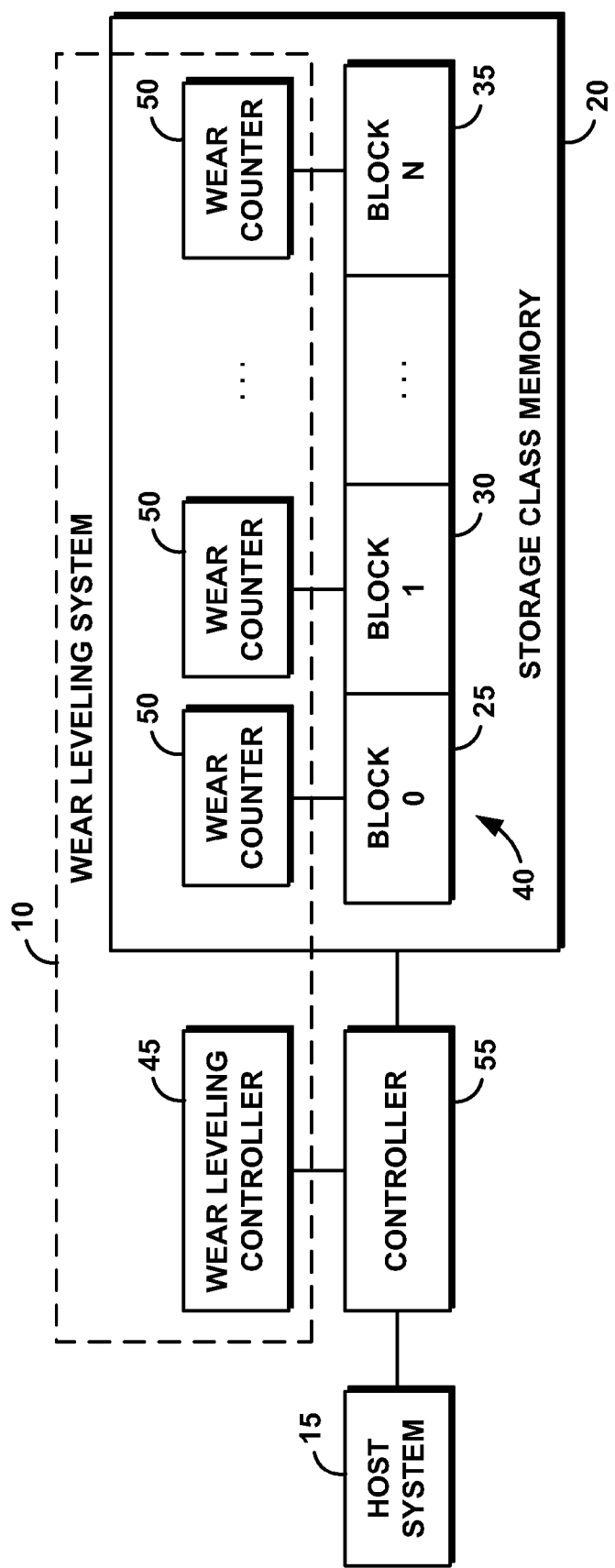
FIG. 1 is a schematic illustration of an exemplary operating environment in which a wear leveling system of the present invention can be used.

FIG. 1 portrays an exemplary overall environment in which a system, a service, a computer program product, and an associated method (the wear leveling system 10 or the "system 10") for distributing addressed write accesses to a memory to level wear on the memory according to the present invention may be used. System 10 comprises a software programming code or a computer program product that is typically embedded within, or installed on a host system 15 utilizing a storage class memory 20. Alternatively, system 10 can be saved on a suitable storage medium such as a diskette, a CD, a hard drive, or like devices.

System 10 can take the form of an entirely hardware embodiment, an entirely software embodiment or an embodiment containing both hardware and software elements. In one embodiment, system 10 is implemented in software, which includes but is not limited to firmware, resident software, microcode, etc.

Furthermore, system 10 can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

The storage class memory 20 comprises a set of physical blocks (interchangeably referenced herein as physical memory blocks or blocks) in which data is stored; the physical blocks are represented in FIG. 1 as block 0, 25, block 1, 30, through block N, 35, collectively represented as physical blocks 40 (interchangeably referenced as blocks 40). System 10 comprises a wear leveling controller 45 and a wear counter 50 for at least some of the physical blocks 40. For an associated physical block, the wear counter 50 maintains a value of a wear level and a count of the number of updates (interchangeably referenced as data writing events) of an associated physical block. The host system 15 accesses the storage class memory 20 through a controller 55.

Controller 55 receives the storage block address from the host system 15 and maps the storage address to the physical block address in the SCM 20 with a storage address to physical block address table. Controller 55 communicates with the wear leveling controller 45 on write operations to update the counters and when required, write data to a block with less wear and change the storage address to physical block address table.

Figure 2:
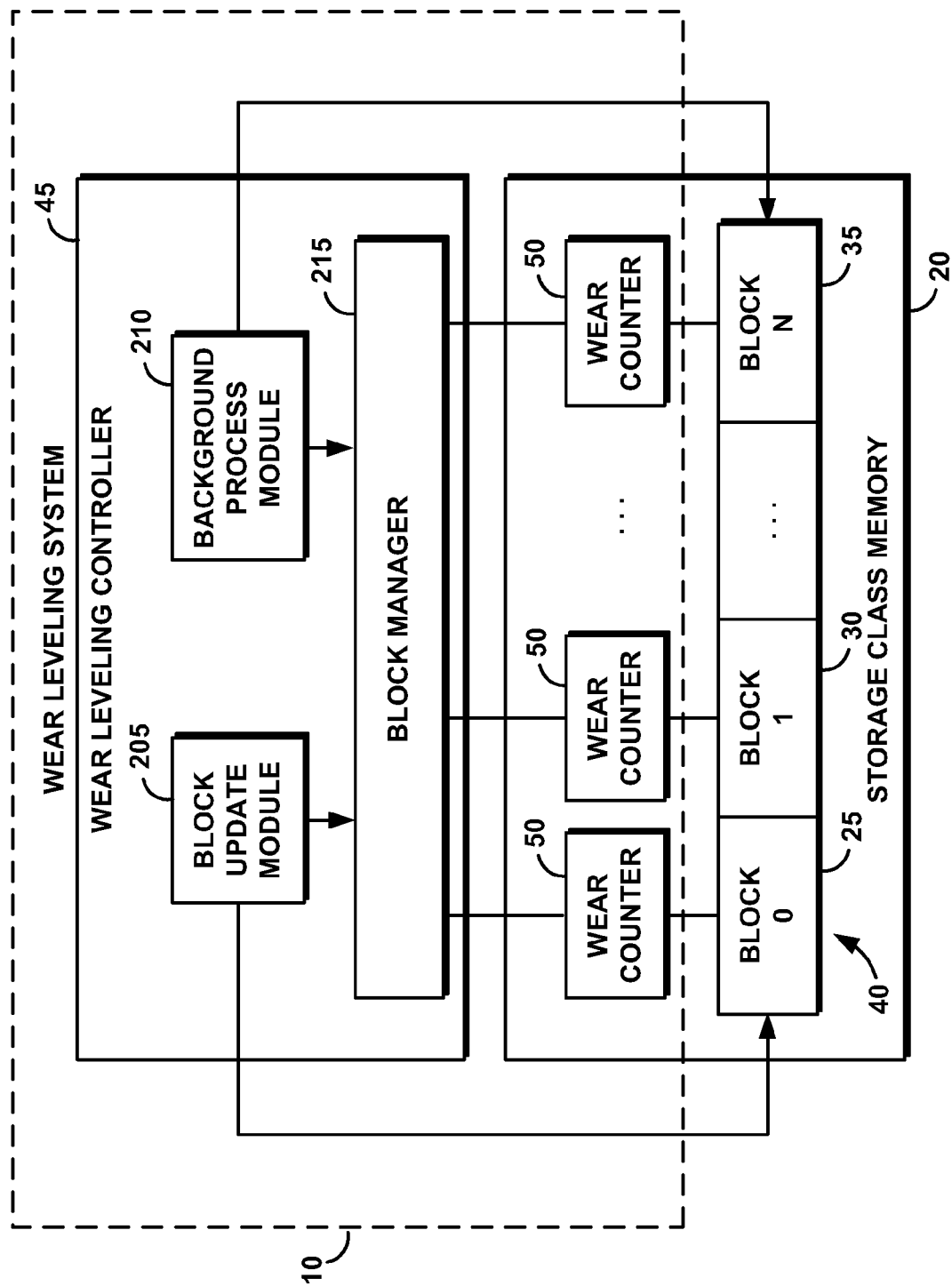
FIG. 2 is a block diagram of the high-level architecture of the wear leveling system of FIG. 1.

FIG. 2 illustrates a high-level architecture of system 10. The wear leveling controller 45 comprises a block update module 205, a background process module 210, and a block manager 215. The block update module 205 monitors the wear level for each of the physical blocks 40 and maintains wear leveling of the physical blocks within a range of updates for the physical blocks 40. To maintain wear leveling, the block update module 205 writes data that are updated frequently to any of the physical blocks 40 that are less used. The block update module 205 may also update data in place. Consequently, the block update module 205 minimizes the variances of a number of update writes for each of the physical blocks 40.

One or more of the physical blocks 40 may contain data that is read-only or updated infrequently. The background process module 210 provides wear for these low-wear physical blocks by moving data in these low-wear physical blocks to physical blocks 40 with higher wear. The background process module 210 minimizes a frequency of moving data with low-update frequency while still using the physical blocks 40 for data with higher wear characteristics. System 10 minimizes the frequency of moving data with low-update frequency by updating data in place until a predetermined threshold is exceeded. In contrast, conventional storage class memory technology moves data from one physical block to another physical block at each update.

Figure 3:
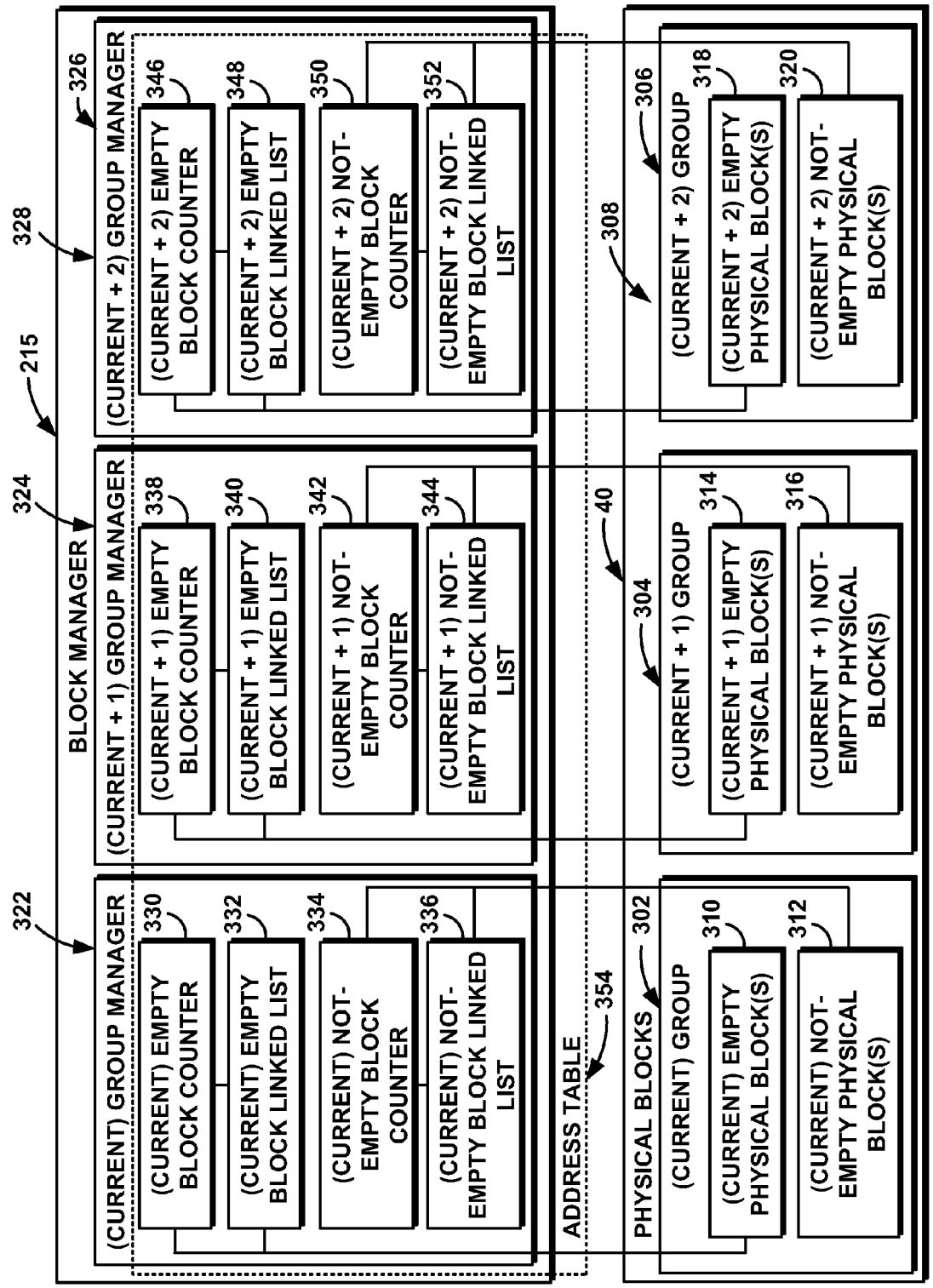
FIG. 3 is a block diagram of a block manager of the wear leveling system of FIGS. 1 and 2.

FIG. 3 illustrates an exemplary high-level hierarchy of the block manager 215 indicating wear level groups in which system 10 organizes the physical blocks 40. The block manager 215 groups physical blocks 40 according to wear as indicated by the wear counter 50 for each of the physical blocks 40. In one embodiment, the block manager 215 comprises at least three wear level groups based on the remaining higher order bits of the wear counter 50 associated with each of the physical blocks 40. For example, the wear counter 50 comprises 32 bits; 20 low order bits of the 32 bits (for 1M update in place cycles) are used to count update cycles. System 10 uses the higher order 12 bits to determine the wear level group for the associated physical block 40.

The block manager 215 utilizes a window of at least three wear level groups to implement wear leveling: a (current) group 302, a (current+1) group 304, and a (current+2) group 306, collectively referenced as wear level groups 308. The (current) group 302 is the least worn group as determined by a wear level of the physical blocks 40. The (current+1) group 304 represents the a least worn group plus one wear level as determined by a wear level of the physical blocks 40. The (current+2) group represents the least worn group plus two wear levels as determined by a wear level of the physical blocks 40.

The (current) group 302 comprises a set of zero or more (current) empty physical block(s) 310 and a set of zero or more (current) not-empty physical block(s) 312. The (current+1) group 304 comprises a set of zero or more (current+1) empty physical blocks 314 and a set of zero or more (current+1) not-empty physical blocks 316. The (current+2) group comprises a set of zero or more (current+2) empty physical block(s) 318 and a set of (current+2) not-empty physical block(s) 320.

System 10 does not require that the absolute least worn physical block in the (current) group 302 be used; any of the least worn physical blocks can be selected. Since storage class memory technologies support a large but not infinite number of write cycles, the range between wear level groups 308 in number of updates or write cycles can be large. For example, for a technology that supports $10^{10}$ write cycles, the wear level groups 308 can be spaced approximately $10^5$ or $10^6$ write cycles apart. The wear characteristics are not precise. For example, the difference between 1,134,567 write cycles and 1,687,654 write cycles is difficult to discern when compared to a life of $10^{10}$ write cycles.

Any of the physical blocks 40 may be updated in place for a number of cycles (i.e., a predetermined update threshold) before moving a data block stored on one of the physical blocks 40 to a less worn physical block. For example, system 10 may update in place a data block in block 0, 25, until the low order bits of the wear counter 50 associated with block 0, 25, are all zero. System 10 then increments the higher order bits of the associated wear counter 50. For instance, a wear counter 50 with low order 10 bits at zero indicates that the associated physical block (e.g., block 0, 25) was updated 1024 times, etc. System 10 may use a higher update threshold, for example, 15 bits (32K or $2^{15}$) or 20 bits (1 M or $2^{20}$). Increasing the update threshold reduces the address directory updates and the level of garbage collection. Essentially, the frequency of overhead operations associated with moving a data block from one of the physical blocks 40 to another of the physical blocks 40 is reduced by the reciprocal of the update threshold.

A (current) group manager 322 manages the (current) group 302. A (current+1) group manager 324 manages the (current+1) group 304. A (current+2) group manager 326 manages the (current+2) group 306. The (current) group manager 322, the (current+1) group manager 324, and the (current+2) group manager 326 are collectively referenced as the group managers 328.

The (current) group manager 322 comprises a (current) empty block counter 330, a (current) empty block list 332, a (current) not-empty block counter 334, and a (current) not-empty block list 336. The (current+1) group manager 310 comprises a (current+1) empty block counter 338, a (current+1) empty block list 340, a (current+1) not-empty block counter 342, and a (current+1) not-empty block list 344. The (current+2) group manager 315 comprises a (current+2) empty block counter 346, a (current+2) empty block list 348, a (current+2) not-empty block counter 350, and a (current+2) not-empty block list 352. An address table 354 comprises the (current) empty block counter 330, (current) empty block list 332, the (current) not-empty block counter 334, the (current) not-empty block list 336, the (current+1) empty block counter 338, the (current+1) empty block list 340, the (current+1) not-empty block counter 342, the (current+1) not-empty block list 344, the (current+2) empty block counter 346, the (current+2) empty block list 348, the (current+2) not-empty block counter 350, and the (current+2) not-empty block list 352.

System 10 maintains a tight distribution of high order block counter values by grouping the physical blocks 40 into wear level groups 308. The (current) group manager 322 tracks the physical blocks 40 that are least worn and thus are candidate physical blocks to be filled. The (current+1) group manager 324 tracks the physical blocks 40 with wear levels in the least worn group plus one. The (current+2) group manager 326 tracks the blocks with wear levels in the least worn group plus two. For example, the update threshold is 1 M. When physical blocks 40 in the least worn group (the (current) group 302) have a wear level of 125, each of the physical blocks 40 in the (current) group 302 has been updated 125×1 M times. Consequently, the (current+1) group 304 has a wear level of 126 (126 M updates) and the (current+2) group 306 has a wear level of 127 (127 M updates).

When system 10 selects one of the physical blocks 40 for updating, the block update module 205 examines the wear value for the selected physical block as maintained by the wear counter 50 for the selected physical block. If the wear counter 50 comprises all zeros in the lower 20 bits (for 1 M update writes per block before moving), then the higher order bits are compared with the value of the wear level for the (current+1) group 304; i.e., 126 for the previously discussed example. If the wear level of the selected physical block is the same as the wear level of the (current+1) group 304, then the selected physical block is updated in place. Updating in place avoids changing the address table 354 and indices. If the value of the high order bits is that of the (current+2) group 306 (with a wear level of 127 in the previously discussed example), then the data in the physical block is moved to any of the (current) empty blocks 310 in the (current) group 302 (with a wear level of 125 in the previously discussed example).

When the value of the (current) empty block counter 330 drops below a predetermined empty-block threshold (near zero), data in physical blocks 40 associated with the (current) group 302 are moved to physical blocks 40 associated with the (current+2) group 306 (with a wear level of 127 in the previously discussed example). The block manager 215 increments by one the wear counter 50 of the physical blocks 40 to which the data is moved, indicating an update in the physical block. This moves the low update activity and read-only data as far forward in wear as possible to minimize the number of times this low update activity and read-only data is moved. If the data block is not read-only or low update frequency, the data block is moved to a block in the (current) group 302 when the data block is updated. A penalty for incorrectly estimating the wear of a physical block is one extra data move and one extra write cycle. If the number of updates-in-place is 1 M or even as low as 1024, one extra write cycle for an incorrect estimate of wear is insignificant.

When some or all of the physical blocks 40 in the (current) group 302 are used and assigned to the (current+1) group 204 (with a wear level of 125 in the previous example), the (current) group 302 is empty. The (current+1) group 304 becomes the (current) group 302 (with a wear level of 126); the (current+2) group 306 becomes the (current+1) group 304 (with a wear level of 127). The wear counter 50 for the physical blocks 40 in the previous (current) group 302 (with a wear level of 125) are zero and used for the (current+2) group 306 (with a wear level of 128). At the start of this cycle, the (current+2) group 306 has no members so the (current+2) not-empty block counter 350 and the (current+2) empty block counter 346 are zero.

Physical blocks 40 assigned to any of the wear level groups 308 are classified as empty physical blocks (further referenced as empty blocks) or not-empty physical blocks (further referenced as not-empty blocks). Empty blocks may be used for data from more worn physical blocks 40. As previously described, the block manager 215 maintains an empty block counter and a not-empty block counter for each of the wear level groups 308. When the block manager 215 increments the wear counter 50 associated with one of the physical blocks 40, the wear counter 50 is checked to determine whether the associated physical block has to move to the next of the wear level groups 308. Associated group counters (i.e., the (current) empty block counter, the (current) not-empty block counter, etc.) are updated when any of the physical blocks 40 moves from one of the wear level groups 308 to the next of the wear level groups 308. The physical block that previously held the moved data is marked as empty or available for update in the (current+1) group 304.

In one embodiment, the block manager 215 associates linked lists with each of the wear level groups 308. One linked list references the empty physical blocks 40 for a specific group in the associated one of the wear level groups 308; that is, the data in the empty physical block has been moved to a physical block with less wear. Another linked list references physical blocks 40 in a specific group of the wear level groups 308 with active data. In FIG. 3, the linked lists for the (current) group 302 comprise the (current) empty block linked list 332 and the (current) not-empty block linked list 336. The linked lists for the (current+1) group 304 comprise the (current+1) empty block linked list 340 and the (current+1) not-empty block linked list 344. The linked lists for the (current+2) group 306 comprise the (current+2) empty block linked list 348 and the (current+2) not-empty block linked list 352.

Order in the linked lists is not critical since all blocks in a linked list are treated similarly. Any of the empty blocks in the (current) group 302, the group with lowest wear, is used for the next data move. To smooth the workload, the block data migration of read-only, low update usage data can be triggered when the number of available blocks falls below a threshold; the data movement can be a background task. If the wear is set so that a block is changed after a large number of write cycles (1024, 1 M, etc.), then the address directory change frequency can be reduced by dividing the update write frequency by this large factor.

Another embodiment does not require linked lists and uses the physical blocks 40 in sequence by scanning through the physical blocks 40. When an empty physical block has a wear level in the (current) group 302, the empty physical block may be used for data from a block with higher wear. When the number of available blocks in the (current) group 302 is below a low level number, then not-empty physical blocks 40 with a wear level corresponding to the value of the (current) group 302 are moved to the (current+2) group 308.

The background process module 210 scans physical blocks 40 and moves data in a background task that maintains a list of least worn candidate blocks for the updated physical blocks and most worn candidate blocks for the low update frequency data blocks. The scan need only find a number of candidates and not be exhaustive. As previously described, if the wear is set so that a physical block is changed after a large number of write cycles (1024, 1 M, etc.), the address directory change frequency can be reduced by dividing the update write frequency by the large factor. When the count of available physical blocks 40 drops below a target number, an address table may be scanned to construct a linked list of available empty physical blocks and a linked list of physical blocks that were in a group when the group was made the least worn group. These lists can be significantly shorter than linked lists of all of the blocks. Physical blocks 40 cannot reduce their wear level so the address table need only be scanned once per group cycle.

In yet another embodiment, system 10 can be used in a storage device without extra physical blocks 40 for "empty" blocks. Data that causes high wear is exchanged with data that causes lower wear to effect wear leveling.

FIG. 4 (FIGS. 4A, 4B, 4C, 4D, 4E, 4F, 4G, 4H, 4I, and 4J) illustrates an exemplary storage class memory 405 comprising block 0, 410, block 1, 415, block 2, 420, block 3, 425, block 4, 430, and block 5, 435 (collectively referenced as physical blocks 440). Data is written to the physical blocks 440 in the form of data blocks comprising data block A, 445, data block B, 450, data block C, 455, and data block D, 460 (collectively referenced as data blocks 465). In this example, the number of updates before a block move in the illustration is one. As disclosed, the number of updates before a block move may be 1024, 1M, etc. In the illustration of FIG. 4, "update C" may indicate a block update decision after 1 M updates to block C, 455, rather than one update, as illustrated.

Figure 4A:
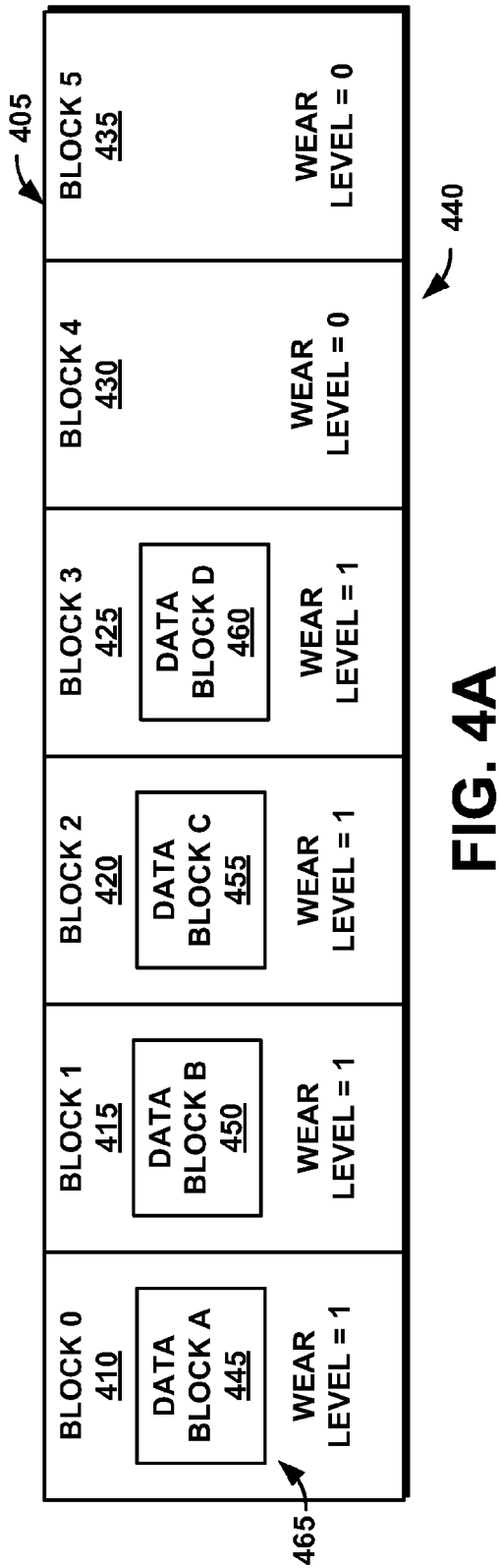
FIG. 4 is comprised of FIGS. 4A, 4B, 4C, 4D, 4E, 4F, 4G, 4H, 4I, and 4J and represents a diagram illustrating an operation of the wear leveling system of FIGS. 1 and 2.

As illustrated in FIG. 4A, data block A, 445, is written to block 0, 410; data block B, 450, is written to block 1, 415; data block C, 455, is written to block 2, 420; and data block D, 460, is written to block 3, 425. Block 0, 410, block 1, 415, block 2, 420, and block 3, 425, have each experienced one write or update, as indicated by the wear level=1 for each of these blocks. The (current) group 302 (the least worn group) comprises empty blocks block 4, 430, and block 5, 435; each of which has a wear level=0. The (current+1) group 304 (the least worn group plus one) comprises block 0, 410, block 1, 415, block 2, 420, and block 3, 425.

Figure 4B:
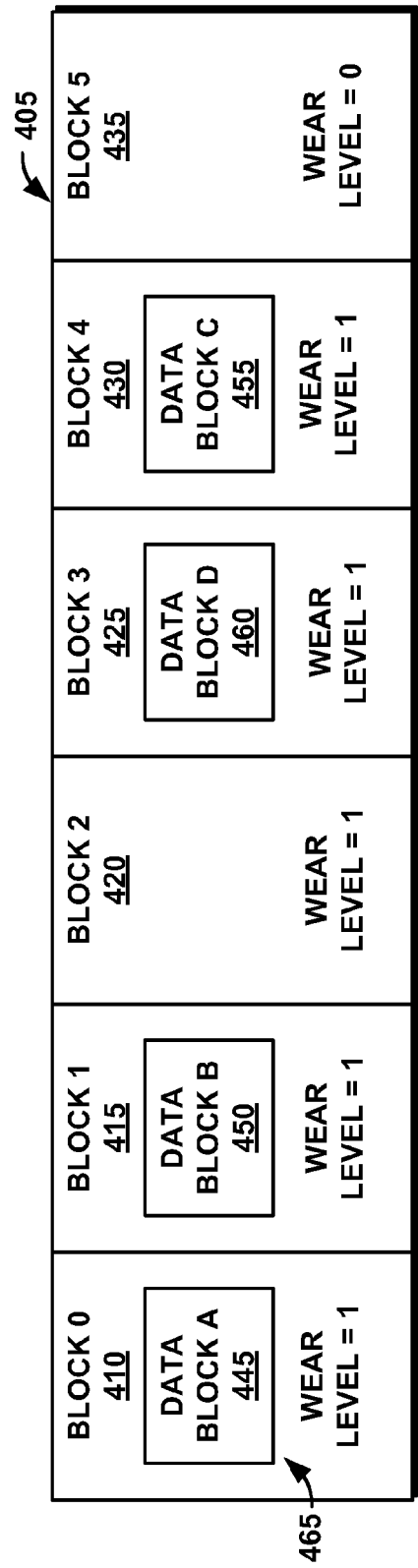

As illustrated in FIG. 4A and FIG. 4B, data block C, 455, is updated. Since data block C, 455, is already associated with the (current+1) group 304 and wear level=1, system 10 moves the data block C, 455, to any of the physical blocks 440 with a wear level lower than that of block 2, 420. In this case, system 10 moves the data block C, 455, to block 4, 430, in the (current) group 302. The block manager 215 increments the wear level of block 4, 430, by one (wear level=1). Block 4, 430, is removed from the (current) group 302 and added to the (current+1) group 304.

Figure 4C:
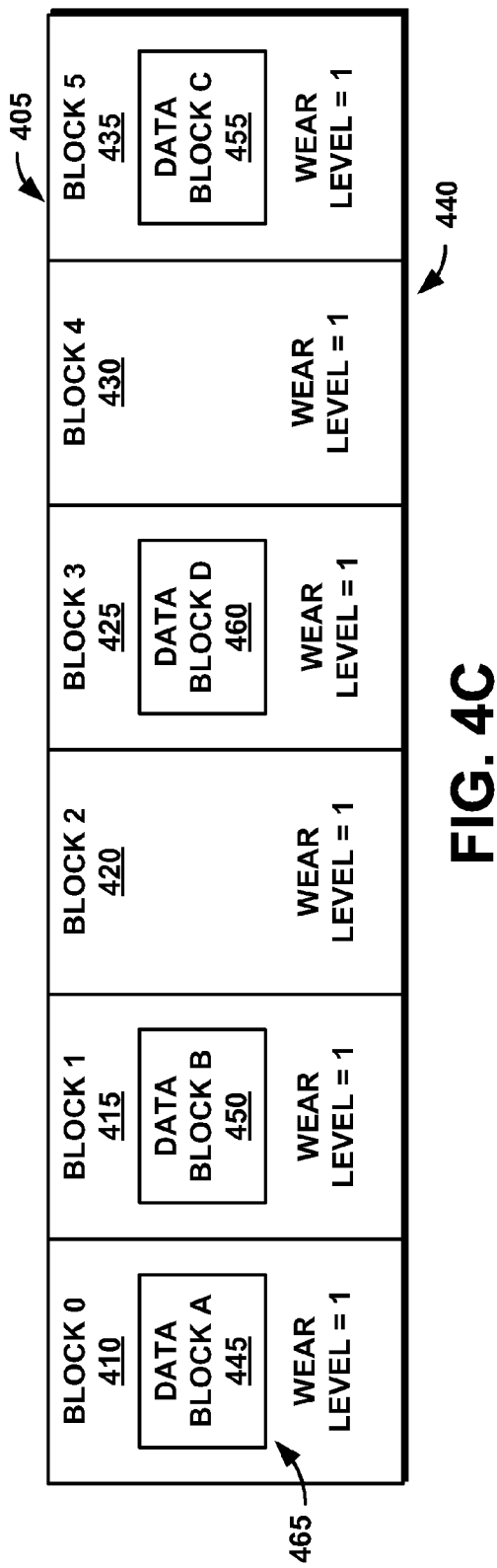

As illustrated in FIG. 4B and FIG. 4C, data block C, 455, is updated again. Since data block C, 455, is associated with the (current+1) group 304 and wear level=1, system 10 moves the data block C, 455, to any of the blocks 440 with a wear level=0; e.g., block 5, 435, in the (current) group 302. The block manager 215 increments the wear level of block 5, 435, by one (wear level=1). Block 5, 435, is removed from the (current) group 302 and added to the (current+1) group 304.

Figure 4D:
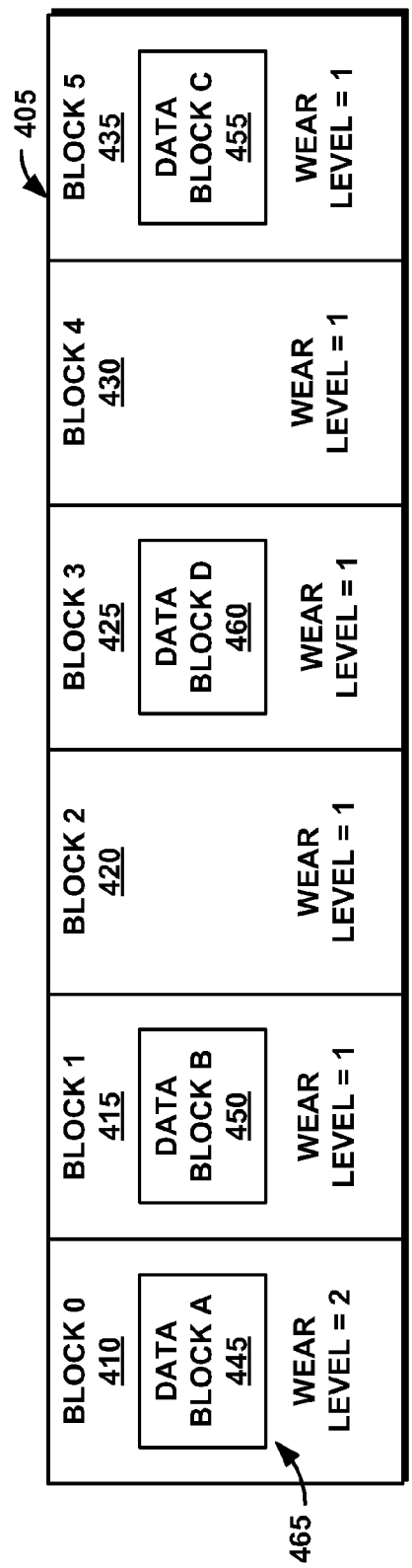

As illustrated in FIG. 4C and FIG. 4D, data block A, 445, is updated. All physical blocks 440 are in the (current+1) group 304. Consequently, data block A, 445, is updated in place. The block manager 215 increments the wear level of block 0, 410, by one (wear level=2). Block 0, 410, is removed from the (current+1) group 304 and added to the (current+2) group 306.

Figure 4E:
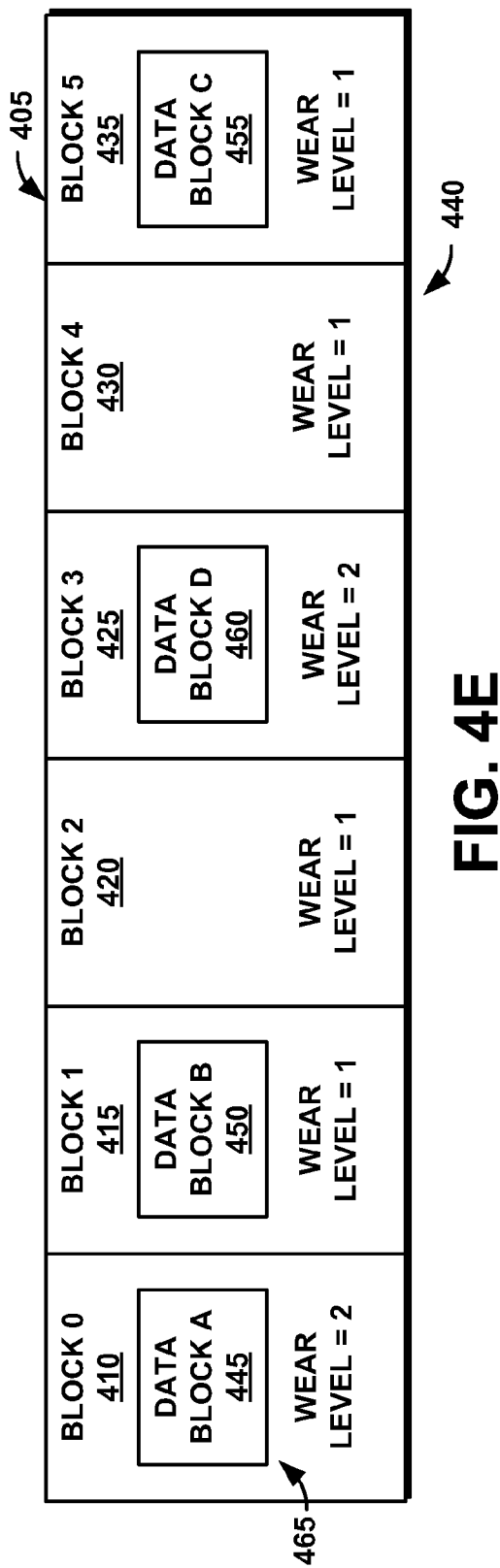

As illustrated in FIG. 4D and FIG. 4E, data block D, 460, is updated. No physical blocks 440 are available with a lower wear level than block 3, 425, the physical block in which data block D, 460, resides. Consequently, data block D, 460, is updated in place. The block manager 215 increments the wear level of block 3, 425, by one (wear level=2). Block 3, 425, is removed from the (current+1) group 304 and added to the (current+2) group 306.

Figure 4F:
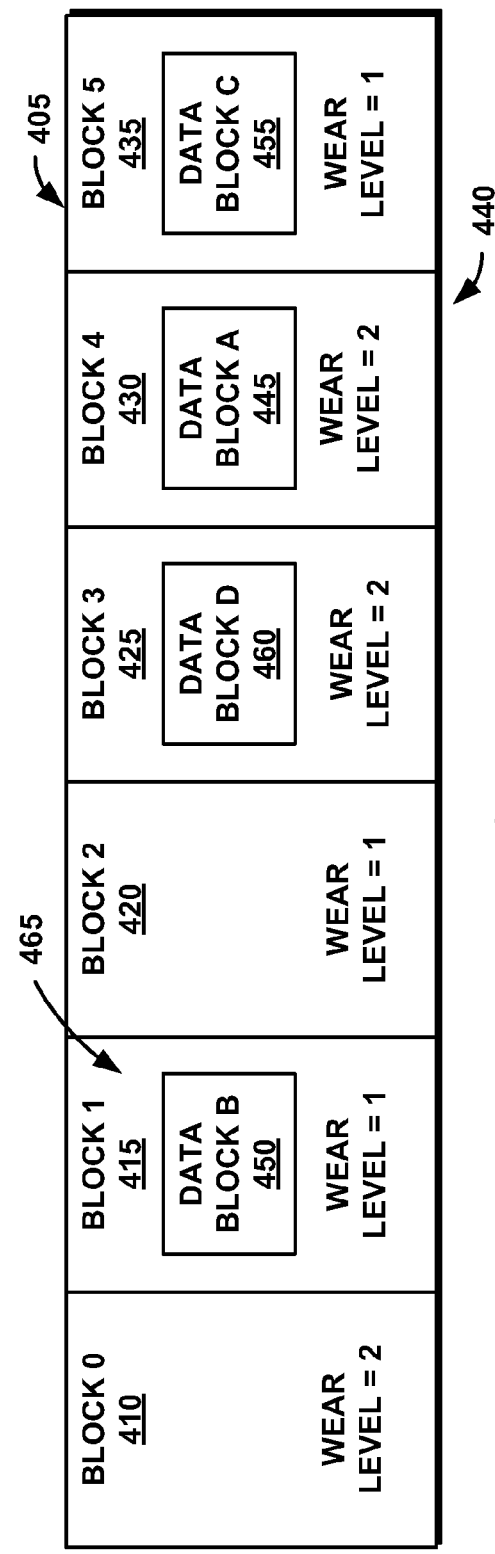

As illustrated in FIG. 4E and FIG. 4F, data block A, 445, is updated. Block 0, 410, is currently in the (current+1) group 304 with a wear level=2. The block manager 215 moves the data block A, 445, to any of the blocks 440 with a wear level=1; e.g., block 4, 430. The block manager 215 increments the wear level of block 4, 430, by one (wear level=2). Block 4, 430, is removed from the (current+1) group 304 and added to the (current+2) group 306.

Figure 4G:
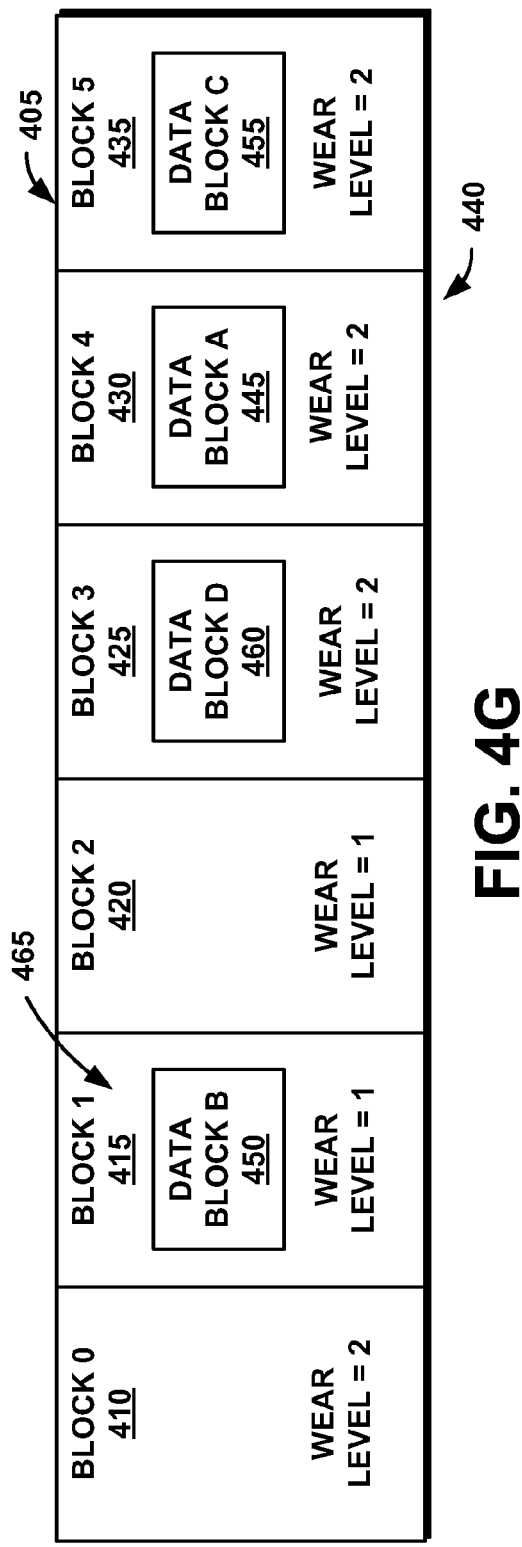

As illustrated in FIG. 4F and FIG. 4G, data block C, 455, is updated. No physical blocks 440 are available with a lower wear level than block 5, 435, in which data block C, 455, resides. Consequently, data block C, 455, is updated in place. The block manager 215 increments the wear level of block 5, 455, by one (wear level=2). Block 5, 455, is removed from the (current+1) group 304 and added to the (current+2) group 306.

Figure 4H:
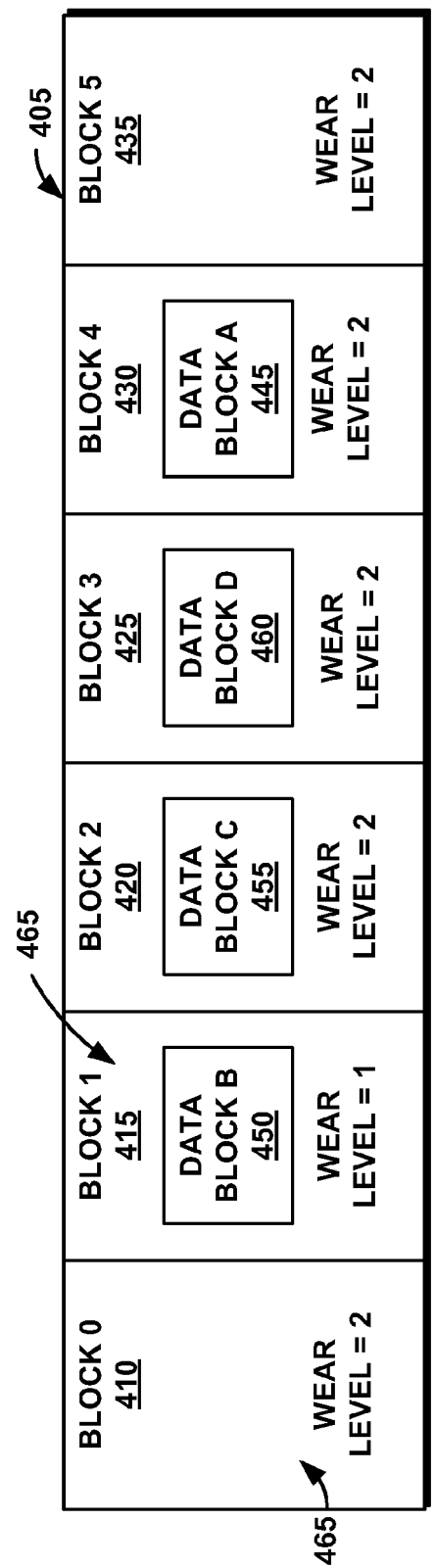

As illustrated in FIG. 4G and FIG. 4H, data block C, 455, is updated again. The block manager 215 moves the data block C, 455, to any of the blocks 440 with a wear level=1; e.g., block 2, 420. The block manager 215 increments the wear level of block 2, 420, by one (wear level=2). Block 2, 420, is removed from the (current+1) group 304 and added to the (current+2) group 306.

As illustrated in FIG. 4H and FIG. 4I, no empty blocks remain in the (current+1) group 304 with a wear level=1. In a background task illustrated by FIG. 4I, the background process module 210 moves the data block B, 450, to any of the empty blocks 440 with a wear level=2 in the (current+2) group 304; e.g., block 0, 410. The block manager 215 increments the wear level of block 0, 410, by one (wear level=3). The data blocks 440 with a wear level=1 are placed in the (current) group 302. The data blocks 440 with a wear level=2 are placed in the (current+1) group 304. Block 0, 410, is added to the (current+2) group 306.

As illustrated in FIG. 4J, data block D, 460, is updated. The data block D, 460, resides in block 3, 425, in (current+1) group 304. The block manager 215 moves the data block D, 460, to one of the data blocks 440 in the (current) group 302; i.e., block 1, 415. The block manager 215 increments the wear level of block 1, 415, by one (wear level=2). Block 1, 415, is removed from the (current) group 302 and added to the (current+1) group 304.

The wear counter 50 for each of the physical blocks 40 increments the wear level each time the associated physical block is updated. The wear counter 50 is logically divided into segments: a wear level group segment (interchangeably referenced herein as a wear level), a higher count segment, and a lower count segment (interchangeably referenced as an update count). The lower count segment counts the number of updates before the block manager 215 makes a block data move decision. The block manager 215 increments the wear level group segment when the lower count segment high order bit carries into the higher count segment when the wear counter 50 is incremented. When the high order bits of the wear level group segment are incremented, the block manager 215 makes a block data move decision.

If the incremented wear level of a physical block in the (current) group 302 is greater than the wear level for the (current+1) group 304, the block manager 215 moves the data in the physical block to an empty block with the wear value of the (current) group. The block manager 215 marks as used the physical block to which the data is moved and the address table 354 is updated to point to the physical block as the address of the data. The previous physical block is marked as empty and added to the (current+2) group 306.

If the incremented block wear level is less than or equal to the wear level of the (current+1) group 304, then the data in the block is not moved. Instead, the data in the block is updated in place.

When the number of empty blocks with the value of the wear level group segment of the (current) group 302 drops below a target value, the background process module 210 moves the data in blocks that have the wear level of the (current) group 302 to blocks with the most wear, i.e., physical blocks 40 in the (current+2) group 306. The data in these least-read blocks are read-only or have very low update frequency and are moved to maintain consistent wear level over some or all of the physical blocks 40. Data in these least-read blocks are moved to physical blocks 40 with high wear to minimize the frequency of moving data blocks exhibiting low update frequency. When the data are moved, the background process module 210 adds the physical blocks 40 to which the data are moved to the (current+2) group 306 and marks as empty the physical blocks 40 from which the data is moved. These newly emptied physical blocks 40 have wear levels of the (current) group 302 and are now available for use.

When the low update activity blocks have been moved and the (current) empty block counter 320 is zero, the block manager 215 converts the (current+1) group 304 to the (current) group 302 and the (current+2) group 306 to the (current+1) group 304. The (current) empty block counter 320 of the previous (current) group 302 is used for the (current+2) group 306.

When data in one of the physical blocks with low update frequency is moved, the wear value may be very low and the block of data moved into the physical block may not have the activity to move the block of data into the (current) group 302. The (current) not-empty physical block counter 334 includes counts of physical blocks 40 that have the wear value of the (current) group 302 or lower. When the (current) empty physical block linked list 332 is below the target for moving data, data in a physical block with the lower wear value are moved and another block of data moved into the physical block with low wear value. The replacement block of data may have higher update activity and wear the physical block.

The address table 354 associates an address table entry with each of the physical blocks 40 in the storage class memory 20. The address table entry comprises an indication if the associated block is empty or contains data (is not empty). The address table entry further comprises the address of the data. Each address table entry comprises an update count that is the count of write cycles executed on the block.

Figure 5:
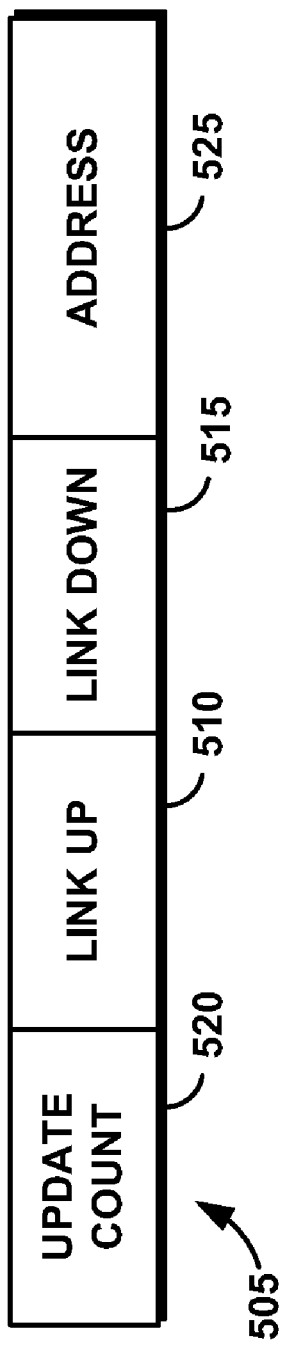
FIG. 5 is a diagram representing a row in an address table of the wear leveling system of FIGS. 1 and 2 in which a double linked list in the address table is used to level wear on physical blocks in the storage class memory.

FIG. 5 illustrates a row 505 of one embodiment of the address table 354 utilizing a double linked list that permits insertion and deletion of an element in the list. The double linked list references one or more of the physical blocks 40, with one entry per physical block in the address table 354 indicated at link up 510 and link down 515. Link up 510 and link down 515 are the entries in the row 505 for the double linked list. The empty physical blocks 40 for a group are linked, for example, in a "link up" list via link up 510; not-empty physical blocks 40 for a group are linked, for example, in a "link down" list via link down 515. Alternatively, the empty physical blocks may be linked in the link down list and the not-empty physical blocks may be linked in the link up list. The empty and full counters are located in the block manager 215 and indicate the number of physical blocks in each list. The physical blocks 40 in either the link up 510 or the link down 515 may be located by traversing the appropriate list. The update count for a physical block represented by row 505 is indicated by an update count 520. The address of the physical block represented by row 505 is indicated by an address 525.

Figure 6:
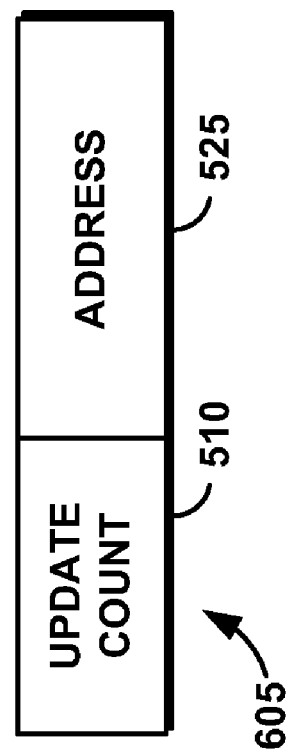
FIG. 6 is a diagram representing a row in an address table of the wear leveling system of FIGS. 1 and 2 in which the address table is scanned to level wear on physical blocks in the storage class memory.

FIG. 6 illustrates a row 605 of another embodiment of a minimized address table. In this embodiment, empty physical blocks 40 and not-empty physical blocks 40 are located by sequential scan of entries in the minimized address table. The block manager 215 creates a list of empty physical blocks; a minimum number are kept in the list. The block manager 215 removes an empty physical block from the list of empty physical blocks when an empty physical block is needed to move data from a physical block with higher wear. When the number of empty physical blocks drops below the minimum number, the address block scan resumes and replenishes the list to a maximum number. When the total number of empty physical blocks drops below a target, the balance of the minimized address table is scanned. All of the remaining empty physical blocks and all not-empty physical blocks with the wear value of the (current) group 302 are found.

In this embodiment, the scans of the minimized address table need only be performed when a physical block reaches the number of updates in the lower count and the physical block count in the least worn empty physical block is below the minimum. A block of data is considered for a move when the lower count is completed. This may divide the update count by a million for a single physical block. The frequency of full address table scanning is very low.

Figure 7A:
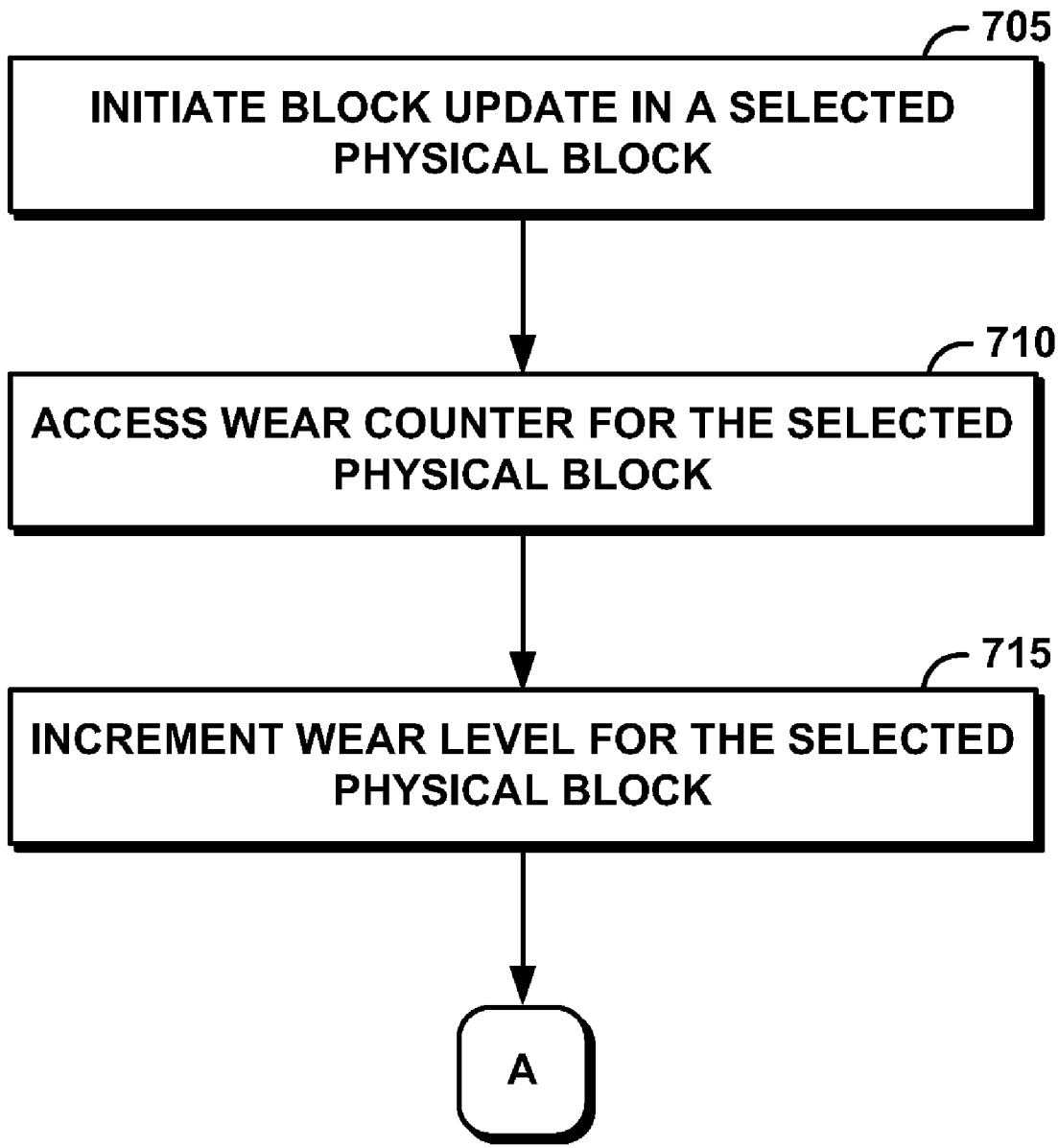
FIG. 7 is a process flow chart illustrating an exemplary method of operation of the wear leveling system of FIGS. 1 and 2 in updating data in physical blocks in a storage class memory.
Figure 7B:
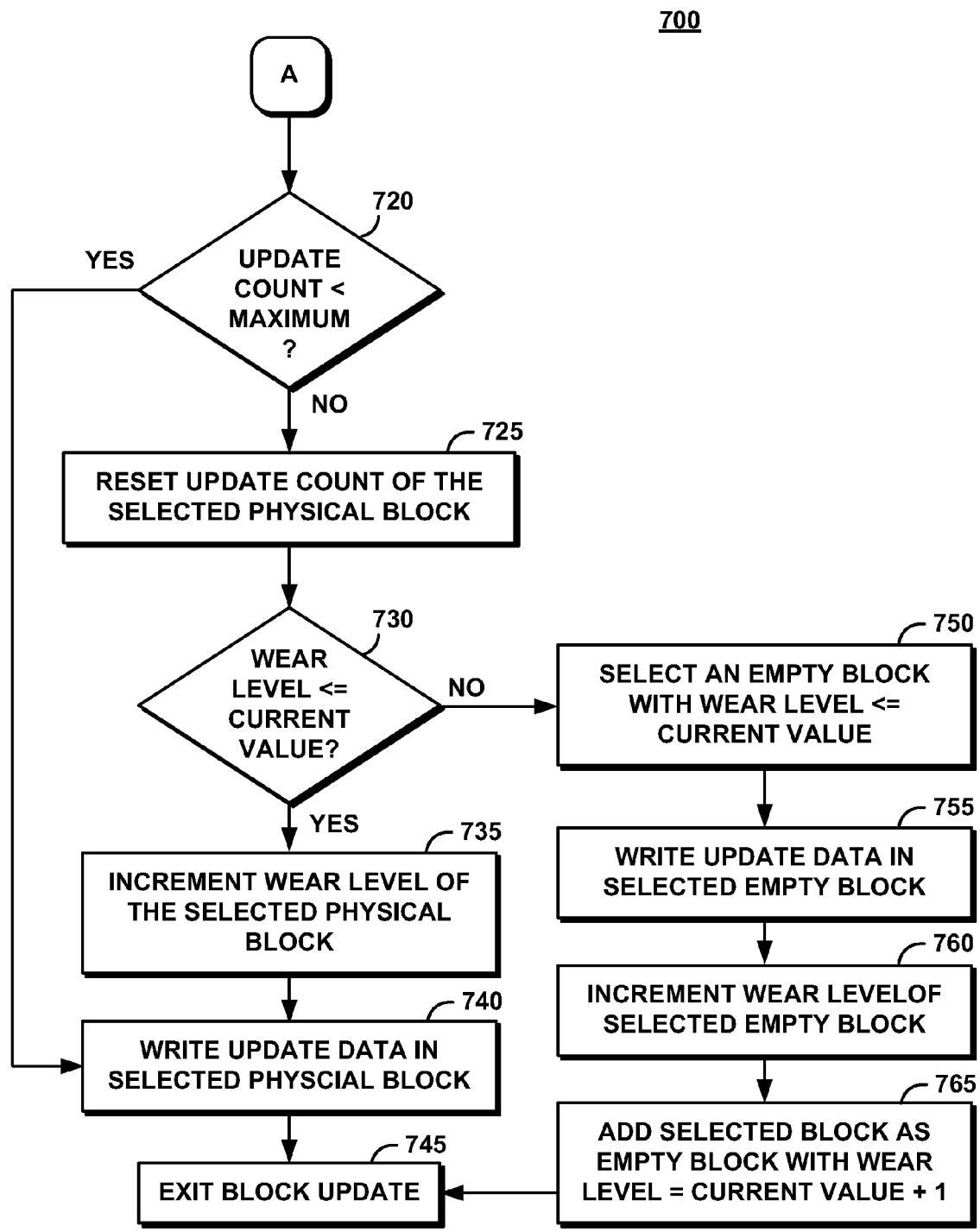

FIG. 7 illustrates an exemplary method 700 of operation of the block update module 205 in updating data in the physical blocks 40 of the storage class memory 20. The block update module 205 initiates a block update (step 705) in a selected physical block. The block manager 215 accesses the wear counter 50 for the selected physical block (interchangeably referenced as the selected block) (step 710). The block manager 215 increments the wear level for the selected physical block (step 715).

The block manager 215 determines whether the update count for the selected physical block is less than a predetermined maximum threshold (a maximum) (decision step 720). If no, the block manager 215 resets the update count for the selected physical block (step 725). The block update module 205 determines whether the wear level for the selected physical block is less than or equal to the value of the (current) group (the current value) (decision step 730). The wear level indicates to which of the wear level groups 308 the selected physical block is currently assigned. If yes, the block update module 205 increments the wear level for the selected physical block, moving the selected physical block from one of the wear level groups 308 to another of the wear level groups 308 (step 735).

The block update module 205 writes the update data in the selected physical block (step 740) and exits block update (step 745). If at decision step 720 the update count of the wear counter 50 of the selected physical block is less than a maximum or predetermined threshold, the block update module 205 writes the update data in the selected physical block (step 740) and exits block update (step 745).

If at decision step 730 the wear level is greater than the current value, the block update module 205 selects an empty physical block (further referenced as the selected empty block) with a group count less than or equal to the current value (step 750). The block update module 205 writes the update data in the selected empty physical block (step 755). The block update module 205 increments the wear level of the selected empty physical block (step 760), moving the selected physical block from one of the wear level groups 308 to another of the wear level groups 308. The block update module adds the selected physical block as an empty physical block with group count=current value+1 (step 765) and exits block update (step 745).

Figure 8:
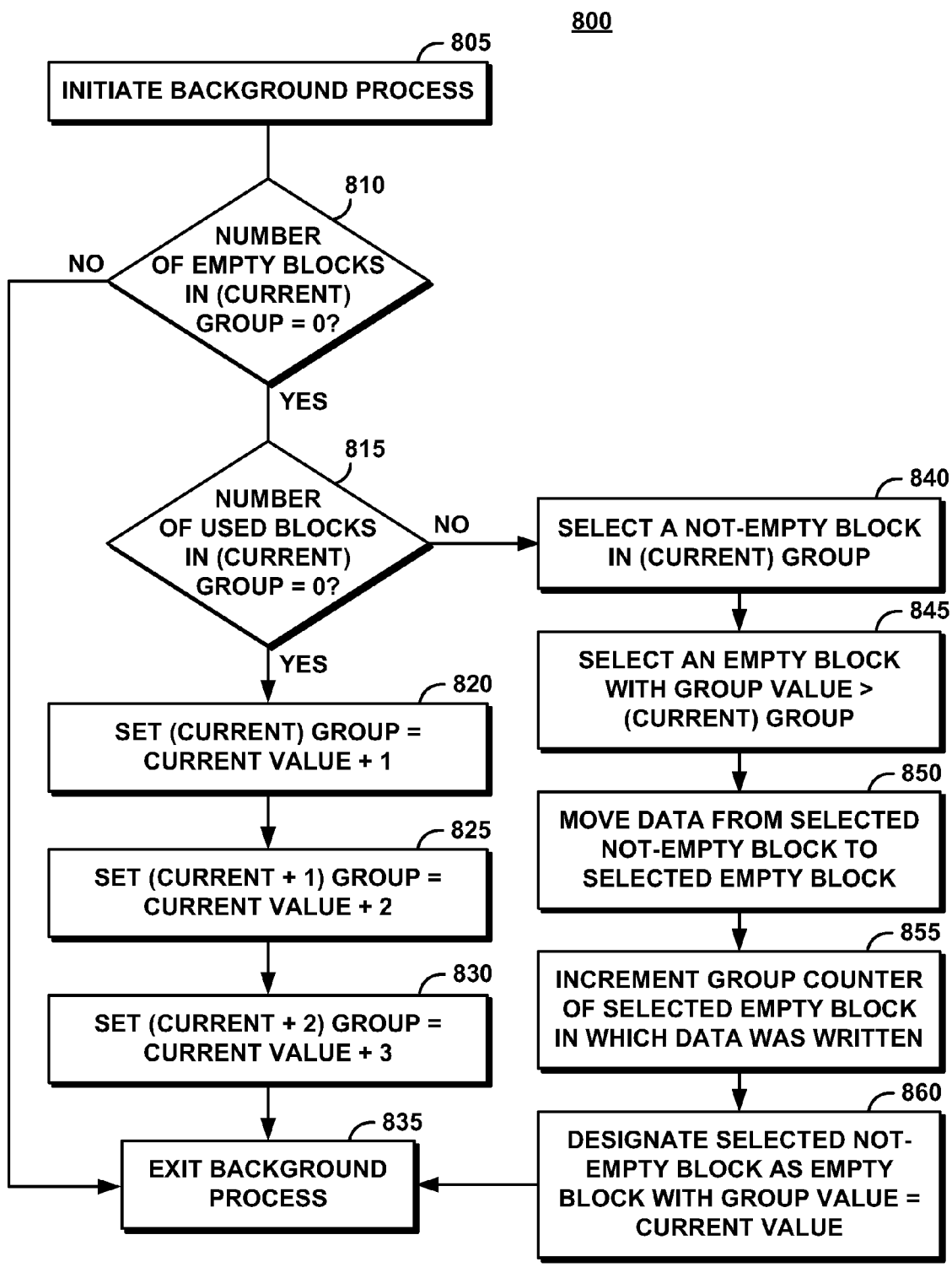
FIG. 8 is a process flow chart illustrating an exemplary method of operation of the wear leveling system of FIGS. 1 and 2 in a wear-leveling background process.

FIG. 8 illustrates an exemplary method 800 of the background process module 210 in moving read only or low update frequency data from one of the physical blocks 40 to a physical block with higher wear, leveling wear of the physical blocks 40 of the storage class memory 20. Method 800 is described for three wear level groups 308; additional wear level groups 308 may be used.

The background process module 210 initiates a background process (step 805). If the number of empty physical blocks in the (current) group=0 (decision step 815), the background process module 210 determines whether the number of used physical blocks in the (current) group=0 (decision step 815). If yes, the background process module 210 sets the wear level of the (current) group to the current value plus one (step 820). The background process module 210 sets the wear level of the (current+1) group to the current value plus 2 (step 825). The background process module 210 sets wear level of the (current+2) group to the current value plus three (step 830). The background process module 210 exits the background process (step 835). If at decision step 810 the number of empty physical blocks in the (current) group is greater than zero, the background process module 210 exits the background process (step 835).

If at decision step 815 the number of used physical blocks in the (current) group is greater than zero, the background process module 210 selects a not-empty physical block in the (current) group (step 840). The background process module 210 selects an empty physical block with a wear level greater than the (current) group (step 845). The background process module 210 moves data from the selected not-empty physical block to the selected empty physical block (step 850). The background process module 210 increments the wear level of the selected empty physical block in which data was written (step 855). The background process module 210 designates the selected not-empty physical block as an empty physical block and sets the associated wear level to the current value (step 860). The background process module 210 exits the background process (step 835).

In one embodiment, system 10 maintains more than three active wear level groups 308 so that the range between the least worn group and most worn group is greater than two. In this embodiment, the read-only or low update activity data moves at a lower rate. For example, if four wear level groups were used the wear level groups comprise a least worn group, a least worn+1 group, a least worn+2 group, and a least worn+3 group. System 10 moves the read-only and low update data when some or all of the least worn group and the empty least worn+1 group are used. System 10 moves the read-only and low update data to the least worn+3 group. With four wear level groups, these blocks of data bypass the least worn+1 group and least worn+2 group and do not move until the third cycle. With three wear level groups, these blocks of data bypass the lease worn+1 group and do not move until the second cycle.

System 10 uses an update-in-place property of the storage class memory to reduce the frequency of block address changes and address table updates to block update frequency divided by the number of update-in-place cycles. The number of update-in-place cycles before changing address may be in the range of $10^5$ to $10^7$ and is a significant reduction of the time and processing overhead for address changes in a conventional storage class memory.

System 10 maintains wear leveling within a narrow band of update writes for some or all physical blocks 40. The band is approximately 3 times the number of update-in-place cycles. For example, if $10^6$ updates are performed before a block address change is performed, most the physical blocks are within $3 \times 10^6$ update cycles of each other.

System 10 manages physical blocks 40 that are read-only or very low update usage. Low update usage physical blocks are exposed to updates so that the maximum number of updates can be supported in a storage class memory. When physical blocks with lowest usage are used, the data in physical blocks 40 that have low usage are moved to one of the physical blocks 40 that have had highest usage. By moving to physical blocks 40 of highest usage, the data need not be moved until the second cycle after the current cycle, It is to be understood that the specific embodiments of the invention that have been described are merely illustrative of certain applications of the principle of the present invention. Numerous modifications may be made to the system and method of updating memory to maintain even wear described herein without departing from the spirit and scope of the present invention.

What is claimed is:

1. A processor-implemented method of updating a storage class memory that includes a first plurality of storage class memory blocks to maintain a generally even wear across the first plurality of storage class memory blocks, the method comprising:

maintaining an update count for a first storage class memory block, where the first storage class memory block uses a material selected from the group consisting of chalcogenides, perovskites, phase change materials, and magnetic bubbles, and the first storage class memory block is one of the first plurality of storage class memory blocks, wherein upon the update count reaching a predetermined wear level threshold:

incrementing a wear counter each time the first storage class memory block is updated, wherein the wear counter is logically divided into segments including a wear level group segment, a higher count segment, and a lower count segment; wherein the lower count segment counts a number of updates; wherein the wear level group segment is incremented when the lower count segment carries into the higher count segment when the wear counter is incremented;

setting a wear value such that the first storage class memory block is changed after a predetermined number of write cycles;

comparing a current wear level group segment of the first storage class memory block to a plurality of current wear level group segments of at least some of other of the first plurality of storage class memory blocks, to determine whether to update in place or move first data on the first storage class memory block to a less-worn second storage class memory block to provide even wear on the first and second storage class memory blocks;

wherein updating in place comprises updating the first data without moving the first data where the wear level group segment of the first storage class memory block is greater than or equal to a wear level group segment of a current group plus one, wherein a minimum of four wear level group segments are specified;

identifying second data in the first storage class memory block that is updated infrequently;

exchanging third data in the first storage class memory block that causes high wear with fourth data that causes lower wear;

moving the second data that is updated infrequently to a more-worn third storage class memory block to provide even wear on the first and third storage class memory blocks;

moving the second data that is updated infrequently, the second data being moved at a lower rate than a rate of the first data that is updated frequently;

moving read-only data, the read-only data being moved at a lower rate than the rate of the first data that is updated frequently;

associating an address table to the first plurality of storage class memory blocks;

scanning the address table in response to one of the first storage class memory blocks reaching the number of updates in the lower count segment and a storage class memory block count in a least worn empty storage class memory block being below a predetermined minimum value;

performing background processing that minimizes a frequency of moving data with low update frequency by updating in place until a predetermined threshold is reached; and converting the current group plus one to the current group, and the current group plus two to the current group plus one, each time the second data that is updated infrequently has completed a move, and an empty block count is zero.

2. The method of claim 1, wherein the update count represents a count of first data writing events addressed to the first plurality of storage class memory blocks.

3. The method of claim 1, wherein updating in place comprises updating the first storage class memory block containing the first data to be updated.

4. The method of claim 1, further comprising grouping the first plurality of storage class memory blocks into a plurality of wear level groups; and wherein each of the wear level groups identifies those of the first plurality of storage class memory blocks that are being worn at any of:
a faster than average rate; and
a slower than average rate.

5. The method of claim 4, wherein the wear level groups comprise a least worn group with a lowest wear level; the least worn group plus one with a wear level equivalent to the least worn group plus one; and the least worn group plus two with a wear level equivalent to the least worn group plus two.

6. The method of claim 5, wherein moving the first data comprises moving the first data to a selected first storage class memory block that is empty in the least worn group and incrementing the wear level of the selected first storage class memory block.

7. The method of claim 5, further comprising maintaining an empty block count of empty ones of the first plurality of storage class memory blocks in the least worn group; and if the empty block count drops below a predetermined empty block count threshold, moving data from at least one of the first plurality of storage class memory blocks in the least worn group to a selected first storage class memory block that is empty in the least worn group plus two and incrementing the wear level of the selected first storage class memory block.

8. The method of claim 1, further comprising utilizing an address table that provides translation from an address memory location to a location of any of the first plurality of storage class memory blocks; and wherein the address table comprises a listing of at least some of the first plurality of storage class memory blocks.

9. The method of claim 8, wherein the address table comprises a value of the wear level for at least some of the first plurality of storage class memory blocks represented in the address table.

10. The method of claim 5, further comprising utilizing an address table that provides translation from an address memory location to a location of any of the first plurality of storage class memory blocks; and wherein the address table comprises a listing of at least some of the first plurality of storage class memory blocks; and identifying an empty first storage class memory block for receiving data by scanning the address table to locate a selected first storage class memory block in the least worn group to receive first data from a first storage class memory block in the least worn group plus two.

11. The method of claim 5, further comprising utilizing an address table that provides translation from an address memory location to a location of any of the first plurality of storage class memory blocks;

wherein the address table comprises a listing of at least some of the first plurality of storage class memory blocks; and further comprising identifying an empty first storage class memory block for receiving data by scanning the address table to locate a selected first storage class memory block in the least worn group plus two to receive data from the first storage class memory block in the least worn group.

12. The method of claim 8, wherein the address table comprises a double linked list to identify at least one of:
a plurality of empty ones of the first plurality of storage class memory blocks; and
a plurality of not-empty ones of the first plurality of storage class memory blocks.

13. A processor-implemented system for updating a memory that includes a first plurality of storage class memory blocks to maintain a generally even wear across the first plurality of storage class memory blocks, the system comprising:

a block manager utilizing storage class memory on a host system for maintaining an update count for a first storage class memory block, and for creating a target number of empty blocks;

a wear leveling controller utilizing the storage class memory on the host system for incrementing a wear counter for the first storage class memory block, wherein the wear counter is incremented each time the first storage class memory block is updated, wherein the wear counter is logically divided into segments including a wear level group segment, a higher count segment, and a lower count segment; wherein the lower count segment counts a number of updates; wherein the wear level group segment is incremented when the lower count segment carries into the higher count segment, and wherein the wear counter is incremented when the update count reaches a predetermined wear level threshold;

wherein the wear leveling controller comprises:

a block update module that monitors wear level for each of the first plurality of storage class memory blocks and maintains wear leveling of the first plurality of storage class memory blocks within a range of updates for the first plurality of storage class memory blocks;

a background process module that identifies infrequently updated first data in the first plurality of storage class memory blocks and moves the infrequently updated first data to those of the first plurality of storage class memory blocks with higher wear;

the background process module reducing a frequency of address directory changes caused by a change in location of the first storage class memory block, by dividing update write frequency by a predetermined factor for the first plurality of storage class memory blocks set to change after a large number of write cycles; wherein when the empty block count falls below the target number of empty blocks, the background process module creates the empty blocks by moving data from one of the storage class memory blocks with low wear to a storage class memory block with high wear, and marking the storage class memory block with low wear as empty;

a scanner that performs scans of an address table in response to one of the first plurality of storage class memory blocks reaching the number of updates in the lower count segment and the storage class memory block count in a least worn empty storage class memory block being below a predetermined minimum value;

a block manager that groups the first plurality of storage class memory blocks according to wear as indicated by a wear counter for each of the storage class memory blocks, wherein the block manager creates separate lists of available empty ones of the first plurality of storage class memory blocks for receiving a moved first storage class memory block, for each of the groups of the first plurality of storage class memory blocks;

wherein the block manager creates a list of storage class memory blocks that were in a least worn group of the first plurality of storage class memory blocks when the count of empty storage class memory blocks is below a given threshold;

wherein the wear leveling controller compares a current wear level of the first storage class memory block to a plurality of current wear levels of at least some other of the first plurality of storage class memory blocks to determine whether to update in place or move data on the first storage class memory block to a less-worn storage class memory block to provide even wear on the first plurality of storage class memory blocks.

14. The system of claim 13, wherein the update count represents a count of first data writing events addressed to the first plurality of storage class memory blocks.

15. The system of claim 13, wherein the wear leveling controller updates in place by updating the first storage class memory block containing the first data to be updated.

16. The system of claim 13, further comprising a block manager for grouping the first plurality of storage class memory blocks into a plurality of wear level groups; and
wherein each of the wear level groups identifies those of the first plurality of storage class memory blocks that are being worn at any of:
a faster than average rate; and
a slower than average rate.

17. A computer program product for updating a memory that includes a first plurality of storage class memory blocks to maintain a generally even wear across the first plurality of storage class memory blocks, the computer program product comprising:

a computer readable storage medium having computer readable program code embodied therewith, the computer readable program code comprising:

a computer readable storage medium selected from the group consisting of solid-state memory, magnetic tape, a removable computer diskette, a random access memory, a read-only memory, a rigid magnetic disk and an optical disk, computer readable program code configured to maintain an update count for a first storage class memory block;

computer readable program code configured to increment a wear counter each time the first storage class memory block is updated, where the wear counter is logically divided into segments including a wear level, a higher count segment, and a lower count segment; wherein the lower count segment counts a number of updates; wherein the wear level is incremented when the lower count segment carries into the higher count segment when the wear counter is incremented;

computer readable program code configured to compare a current wear level of the first storage class memory block to a plurality of current wear levels of at least some other of the first plurality of storage class memory blocks, to determine whether to update in place or move first data on the first storage class memory block to a less-worn storage class memory block to provide even wear on the first plurality of storage class memory blocks;

computer readable program code configured to exchange second data that causes high wear with third data that causes lower wear;

computer readable program code configured to create separate lists of available empty storage class blocks for receiving a moved storage class block, for each of a plurality of groups of storage class blocks;

computer readable program code configured to compare the wear level of each storage class block in a current group with the wear level of the current group plus one;

computer readable program code configured to move each storage class block in the current group with wear level greater than the wear level of the current group plus one into empty blocks;

computer readable program code configured to scan an address table in response to at least one of the first storage class memory blocks reaching the number of updates in the lower count segment and a storage class memory block count in a least worn empty storage class memory block being below a predetermined minimum value;

computer readable program code configured to perform background processing that minimizes a frequency of moving data with low update frequency by updating in place until a predetermined threshold is reached; and computer readable program code configured to identify fourth data in the first storage class memory block that is updated infrequently and moving the fourth data that is updated infrequently to a more-worn storage class memory block to provide even wear on the first plurality of storage class memory blocks, wherein the program codes are stored on the computer readable medium.

18. The computer program product of claim 17, wherein the update count represents a count of data writing events addressed to the first plurality of storage class memory blocks.

19. The computer program product of claim 17, further comprising a computer readable program code configured to update the first storage class memory block containing the data to be updated.

20. The computer program product of claim 17, further comprising a computer readable program code configured for grouping the first plurality of storage class memory blocks into a plurality of wear level groups; and wherein each of the wear level groups identifies those of the first plurality of storage class memory blocks that are being worn at any of:

a faster than average rate; and a slower than average rate.

\* \* \* \* \*